United States Patent [19]

Hallinger et al.

[11] Patent Number: 4,741,153

[45] Date of Patent: May 3, 1988

[54] SYSTEM FOR CONTROLLING HEAT EXPANSION AND THERMAL STRESS IN A GAS TURBINE DISK

[75] Inventors: Claude C. Hallinger; Robert Kervistin, both of, Le Mee Sur Seine, France

[73] Assignee: Societe Nationale d'Etude et de Construction de Moteurs d'Aviation, "S.N.E.C.M.A.", Paris, France

[21] Appl. No.: 434,423

[22] Filed: Oct. 14, 1982

[30] Foreign Application Priority Data

Oct. 14, 1981 [FR] France .................. 81 19293

[51] Int. Cl.$^4$ .............................. F02C 7/12
[52] U.S. Cl. .................... 60/39.07; 415/116
[58] Field of Search ............. 60/39.07; 415/115, 116, 415/117

[56] References Cited

U.S. PATENT DOCUMENTS

| | | | |
|---|---|---|---|
| 2,791,091 | 5/1957 | Wheatley et al. | 415/115 |
| 2,973,937 | 3/1961 | Wolf | 416/95 |
| 3,034,298 | 5/1962 | White | 415/115 |
| 3,437,313 | 4/1969 | Moore | 415/115 |
| 3,584,458 | 6/1971 | Wetzler | 415/115 |
| 3,973,396 | 8/1976 | Kronogard | 415/116 |
| 4,117,669 | 10/1978 | Heller | 415/116 |
| 4,217,755 | 8/1980 | Williams | 60/39.75 |

FOREIGN PATENT DOCUMENTS

| | | |
|---|---|---|
| 845966 | 9/1939 | France . |
| 1593039 | 7/1970 | France . |
| 2290574 | 6/1976 | France . |
| 2280791 | 10/1977 | France . |
| 2467292 | 4/1981 | France . |
| 621300 | 4/1949 | United Kingdom . |

OTHER PUBLICATIONS

Metzger et al., *Heat Transfer between an Impinging Jet and a Rotating Disk*, Journal of Heat Transfer, Nov. 1977.

*Primary Examiner*—Louis J. Casaregola
*Attorney, Agent, or Firm*—Oblon, Fisher, Spivak, McClelland & Maier

[57] ABSTRACT

The invention concerns a system for controlling heat expansion and thermal stress in a gas turbine disk. The system includes perforated plates mounted close to and facing at least one surface of the disk, particularly opposite its rim and around its thick inner bored section. Conduits are provided for bleeding cold air and hot air from various stages of the compressor or from the turbine and for injecting cold air toward the rim of the disk and hot air toward its thick inner bored section through the corresponding perforated plates at the beginning of each acceleration, and, preferentially, during deceleration, for injecting hot air toward the said rim and cold air toward said inner bored section. The invention applies particularly to gas turbines used to propel aircraft.

8 Claims, 2 Drawing Sheets

SYSTEM FOR CONTROLLING HEAT EXPANSION AND THERMAL STRESS IN A GAS TURBINE DISK

BACKGROUND OF THE INVENTION

1. Field of the Invention

The present invention concerns a system for simultaneously controlling Heat expansion and thermal stress in a gas turbine disk.

2. Description of the Prior Art

Various processes for the thermal conditioning of gas turbine disks are already known. French Patent No. 1593039, filed Sept. 27, 1968 by Societe Anonyme Bennes Marrel, describes a system for cooling a gas turbine. Cold air from a compressor is directed toward the rim of the disk through an appropriate conduit opening into a seal facing said rim. Hot air is -bled from the location of the nozzle associatedwith the disk. Part of the hot air is sent directly over the outer part of the disk's rim, with the rest being mixed with the cold air emerging from the above-mentioned seal. Cold air bled from the compressor is channeled into an annular chamber situated between the opposing surfaces of two turbine disks. The inner circumferential wall of this chamber includes perforations leading into two other annular chambers separated by an essentially radial partition, so that cold air escaping from said annular chambers will sweep the two opposing surfaces of the disk. The other surface of the second disk is itself swept by a flow of air resulting from the mixture of atmospheric air with air which has circulated around the exhaust pipe. All of these arrangements use hot and/or cold air, mixed or unmixed, from various sources, to thermally condition the rim of one or more gas turbine disks. The system described above obviously does not permit systematic conditioning of the temperature of each disk of the gas turbine, particularly at preset moments in its operating cycle.

French Patent No. 2,290,574, filed Nov. 5, 1974, describes a group of gas turbines comprising, on either side of a disk, two perforated plates behind which is directed a mixture of two flows of air, hot and cold, arriving from separate channels. The air mixtures emerging from said metal plates flow over the opposite surfaces of the disk near the rim.

The French Patent Nos. 2,280,791 and 2,467,292 to the same Assignee describe a system for automatically regulating the clearance between the rotor blades of a gas turbine and the opposing wall of its stator. This adjustment is achieved by directing jets of appropriately temperature-adjusted heating or cooling air over the outer surface of the stator wall. These jets of thermal conditioning air do not come into contact with the rotor blades or the rotor disk.

Among the various known processes for the thermal conditioning of gas turbine disks, the most effective is certainly the process in which at least one of the two surfaces of the disk is jets of air, as described in the article published by Metgzer and Grochowsky in the *Journal of Heat Transfer* (vol. 99, Nov. 1977, pp 663–667).

SUMMARY OF THE INVENTION

The main object of the present invention is to control the heat expansions and thermal stresses which appear in a gas turbine disk by reason of its thermal inertia, particularly in during the transient operating phases. Whenever the turbine accelerates, its rotor disk expands much more slowly than the rotor blades and the surrounding stator case. The result is a relatively great increase in the clearance between blades and case and, consequently, a drop in the turbine's performance. When decelerating, on the other hand, the rotor disk contracts more slowly than the case, which means that a wide clearance must be provided assembly since otherwise an increase in clearance during transients will be created during use due to wear of honeycomb seals at blade tips. Either of these factors results in excessive clearance during stabilized operation, which lowers the turbine performance.

The system for controlling heat expansion and thermal stress in a gas turbine disk according to the invention includes known means for causing jets of air to impinge at least one of the two surfaces of the disk, together with perforated plates mounted close to and facing certain areas of at least one surface of the disk, particularly opposite the rim and around the thick inner bored portion. Means are provided for bleeding hot and cold air from preceding stages of the compressor or turbine and for switching the air bleed so as to be able to inject cold air toward the disk's rim and hot air toward its thick inner bored portion through the corresponding perforated metal plates at the beginning of each acceleration, and, upon each deceleration, to inject hot air toward the rim and cold air toward the inner bored portion, with the number, distribution and size of the air injection perforations being chosen so as to minimize the radial temperature gradient in the corresponding surface of the disk during each operating phase.

The invention therefore makes it possible to slow the expansion of the disk rim while increasing that of the thick inner bored portion, as the turbine accelerates, and, upon deceleration, to slow the contraction of the rim while increasing that of the inner bored portion. This makes possible a maximal reduction in the radial temperature gradient of the disk during the transient phases of the turbine's operation, so as to reduce or eliminate the thermal stresses which may result from such a gradient. The obvious results are an increase in the life of the disk, as well as the ability to provide for as small a clearance as possible between rotor blades and case during steady operation, so as to improve the performance of the turbine.

In a preferred embodiment of the means according to the teachings of the invention, a distribution chamber is provided opposite the disk an adjacent the surface of at least some of the perforated metal plates. This distribution chamber may be divided by essentially circumferential partitions into several separate chambers stepped radially with respect to the disk and supplied with flows of air of different temperatures. At least one stationary perforated plate may be mounted opposite each surface of the disk's rim in order to control the thermal gradient on the two surfaces. Perforated plates surrounding the thick inner bored portion of said disk may also be made integral with the disk, in which case they will be supplied with air from the space between the compressor drum and the central tube passing through the bore in the disk.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 3 schematically shows the embodiment of the disk in the gas turbine.

DETAILED DESCRIPTION OF THE PREFERRED EMBODIMENTS

Figure 1:
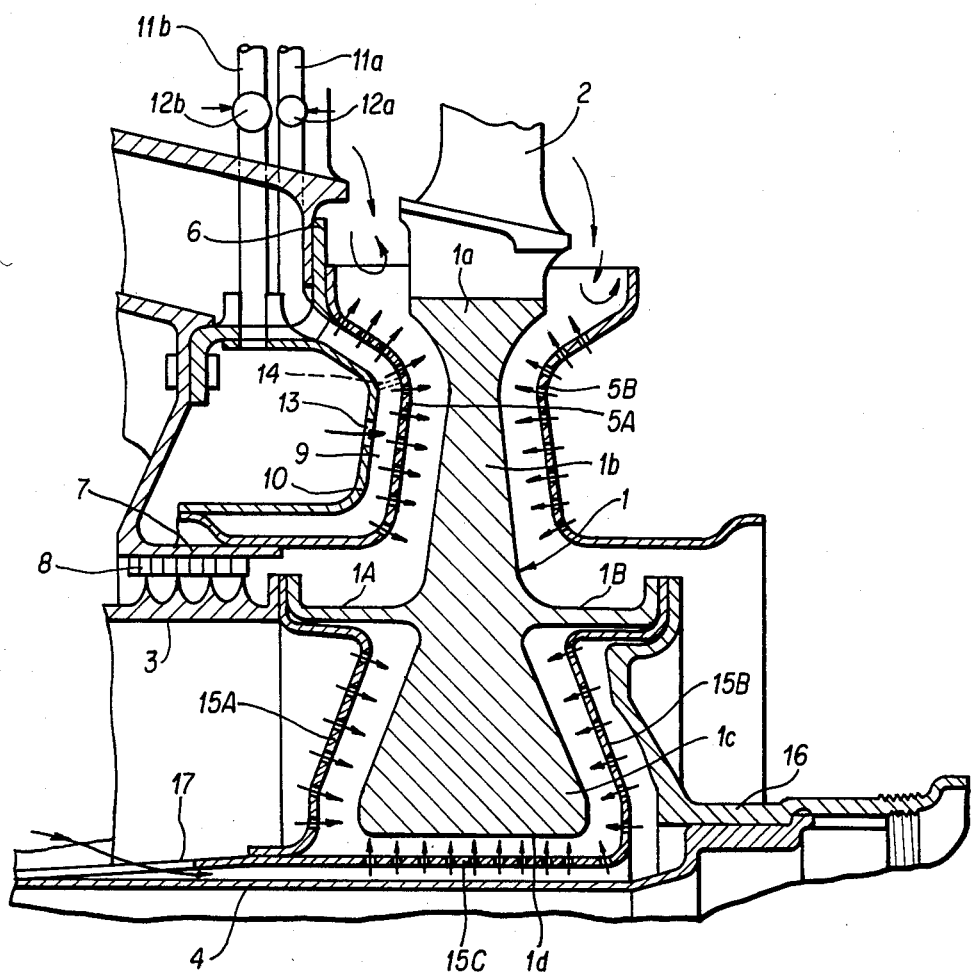
FIG. 1 shows an axial half-plane cross section through a gas turbine disk equipped with an embodiment of the invention.

Reference 1 in FIG. 1 designates a gas turbine disk having a rim 1a, around the periphery of which is fastened a row of blades such as 2. Reference 1b represents the web of disk 1 and 1c represents the disk's thick inner bored portion, called the "bulb". In the embodiment of the gas turbine illustrated here by way of example, bulb 1c is within the space between compressor drum 3 and central tube 4 which passes through bore 1d of disk 1. The disk further includes two circumferential flanges 1A and 1B which allow it to be fastened by any suitable means (e.g., bolts) to parts 3 and 4, respectively.

According to the present invention, two perforated metal plates 5A and 5B are affixed facing the two opposite surfaces of the rim 1a and web 1b of disk 1. These perforated plates are shaped like annular gutters, whose cross section, through an axial half-plane, is of the form which can be seen in FIG. 1, adapted to the shape (in the same plane) of the corresponding surfaces of parts 1a and 1b of disk 1. The arrangement leaves an annular space of essentially uniform width between the perforated sections of plates 5A and 5B, and the closest surface of disk 1. The annular gutter-shaped perforated plates 5A and 5B are each fastened to stationary parts of the turbine. The radially outermost edge of plate 5A is fastened to support 6 of the nozzle associated with disk 1, while its innermost edge is fastened to support 7 of a labyrinth-seal 8.

According to another feature of the present invention, a distribution chamber 9 is provided over the surface of perforated plate 5A opposite disk 1. In the illustrated embodiment, this distribution chamber 9 is delimited by perforated plate 5A and a second plate 10, likewise annular and having a transverse cross-section adapted to that of perforated plate 5A, so as to make said chamber 9 essentially regular in dimension in all directions perpendicular to plates 5A and 10. Also in this embodiment, distribution chamber 9 is supplied with air from two pipes, with one pipe 11a bringing in cold air, e.g., from an appropriate stage of the compressor (not shown), and the other pipe 11b bringing in hot air, e.g., from one of the earlier stages of the turbine itself. Valves 12a and 12b, controlled by an automatic device which is not shown, are inserted in pipes 11a and 11b respectively, in order to control the respective rates of flow within them. For example, hot air is brought through pipe 11b into a space defined by the gutter-shaped perforated plate 10, while cold air is brought through pipe 11a into distribution chamber 9, into which the hot air penetrates through openings such as 13. The hot and cold air thus mix in distribution chamber 9 before escaping through the perforations in plate 5A in the form of jets of air of a controlled temperature, the jets impinging the opposing portions of the nearest disk surface (particularly its rim 1a and web 1b). A similar arrangement could be provided to supply air to the other surface of disk 1 through the perforations in plate 5B. In a simplified embodiment, it is possible to eliminate the distribution chamber 9, with perforated plate 5B (shaped like an annular gutter) being supplied directly with mixed air, e.g., through at least one merger of pipes 11a and 11b.

In a variant, distribution chamber 9 may be divided by essentially circumferential partitions, as shown in dotted lines and designated by numeral 14, into several separate chambers, particularly into two separate chambers, stepped radially with respect to disk 1, with the outermost chamber being supplied directly through pipe 11a and the innermost through pipe 11b, by way of perforations such as 13. It will be understood that this arrangement makes it possible to direct flows of air of different temperatures respectively onto rim 1a and web 1b of disk 1.

According to another feature of the invention, perforated plates 15A, 15B, and 15C are set up so as to surround the thick inner bored part, or bulb 1c, of disk 1, while providing a free space around said bulb of essentially uniform width, as seen from the direction perpendicular to the corresponding perforated plate. In the embodiment illustrated in FIG. 1, perforated plate 15A is shaped like a shallow annular gutter and is arranged so that its perforated portion is essentially parallel to the corresponding surface of bulb 1c. The outermost edge of perforated plate 15A forms a sort of flange in a plane perpendicular to the shaft of the turbine, and this flange is held, e.g., by means of bolts (not shown), between a similarly shaped end of circumferential flange 1A and another similarly shaped flange provided at the end of compressor drum 3. Perforated plates 15B and 15C are constructed, in this embodiment, from a single piece having two perforated sections, with one 15B being essentially parallel to the corresponding surface of bulb 1c and the other 15C essentially parallel to the base of the bulb, i.e., to bore 1d of disk 1. Plate piece 15B-15C is of course annular in shape. Its radially outermost edge has a flange extending in a plane perpendicular to the shaft of the turbine, with said flange being clamped, like that of perforated plate 15A, between the correspondingly shaped end of circumferential flange 1B of disk 1 and another similarly shaped flange provided at the outermost edge of part 16, integral with the end of central tube 4 which passes through bore 1d. Beyond its perforated section 15C, the plate 15C is fastened (e.g., by means of bolts, not shown) to the innermost edge of perforated plate 15A, beyond which point it extends in the shape of a truncated cone, converging toward the left of FIG. 1 and including ports 17. The end of this extension of plate 15C, located off to the left of FIG. 1, is fastened by an appropriate means to the corresponding section of central tube 4, which passes through bore 1d in disk 1, at an essentially uniform distance from perforated plate 15C. Known means (not shown), which may be analogous to those previously described and designated by numerals 11a, 11b, 12a, and 12b, make it possible to direct desired quantities of cold air, hot air, or a mixture of the two, at a set temperature, into the annular space between compressor drum 3 and the truncated extension of perforated plate 15C. A portion of this air flow escapes from the above-mentioned annular space through the perforations in plate 15A, forming jets of air which impinge the corresponding surface of bulb 1c. The rest of the flow of air moves through ports such as 17 into the narrow annular space between central tube 4 and perforated plate 15C. A first portion of the flow of air which passed through ports 17 escapes from said annular space through the perforations in plate 15C, in the form of jets of air which impinge the inner cylindrical surface of bore 1d in disk 1, while a second portion of the same air flow moves into the space between perforated plate 15B and the corresponding part of piece 16, which form a distribution chamber similar to above-mentioned chamber 9, from which said second portion of the air flow escapes through the perforations of plate 15B in the form of jets of air which impinge the corresponding surface of bulb 1c.

The number, distribution (particularly in the radial direction), and size of the air injection perforations in plates 5A, 5B, 15A, 15B, and 15C are chosen according to the invention in such a way as to reduce as far as possible the radial temperature gradient of the corresponding surface of the disk, i.e., the corresponding surface of rim 1a and web 1b for perforated plates 5A and 5B, and of bulb 1c for perforated plates 15A, 15B, and 15C. It will be under, in fact, that the cooling or heating of a given portion of the disk will depend not only on the temperature of the air jets impinging that area, but also on the number of these jets and their respective output, which depends particularly on the size of the perforations in the corresponding plates.

The device of the invention which has just been described operates as follows. At the beginning of each phase of acceleration of the turbine, valve 12b is closed and the automatic device mentioned above temporarily opens valve 12a, so as to permit the passage of cold air bled from a stage of the compressor through pipe 11a and into distribution chamber 9, from which it escapes through the perforations in plate 5A as jets of cooling air, which impinge the leftmost surfaces (in FIG. 1) of the roots of blades such as 2, as well as the rim 1a and sail 1b of disk 1. At the same time, means analogous to those just described enable the rightmost surfaces of the same parts of disk 1 to be struck by jets by cooling air emerging from the perforations of plate 5B. Comparable means, which are not described in detail, make it possible to simultaneously send hot air, or a mixture of hot and cold air at a preset temperature, into the annular space between compressor drum 3 and the truncated extension of perforated plate 15C on the left of FIG. 1. As a result, jets of heating air at an appropriate temperature impinge the right and left surfaces of bulb 1c of disk 1, as well as the inner surface of its bore 1d, through the perforations in plates 15A through 15C.

Figure 2:
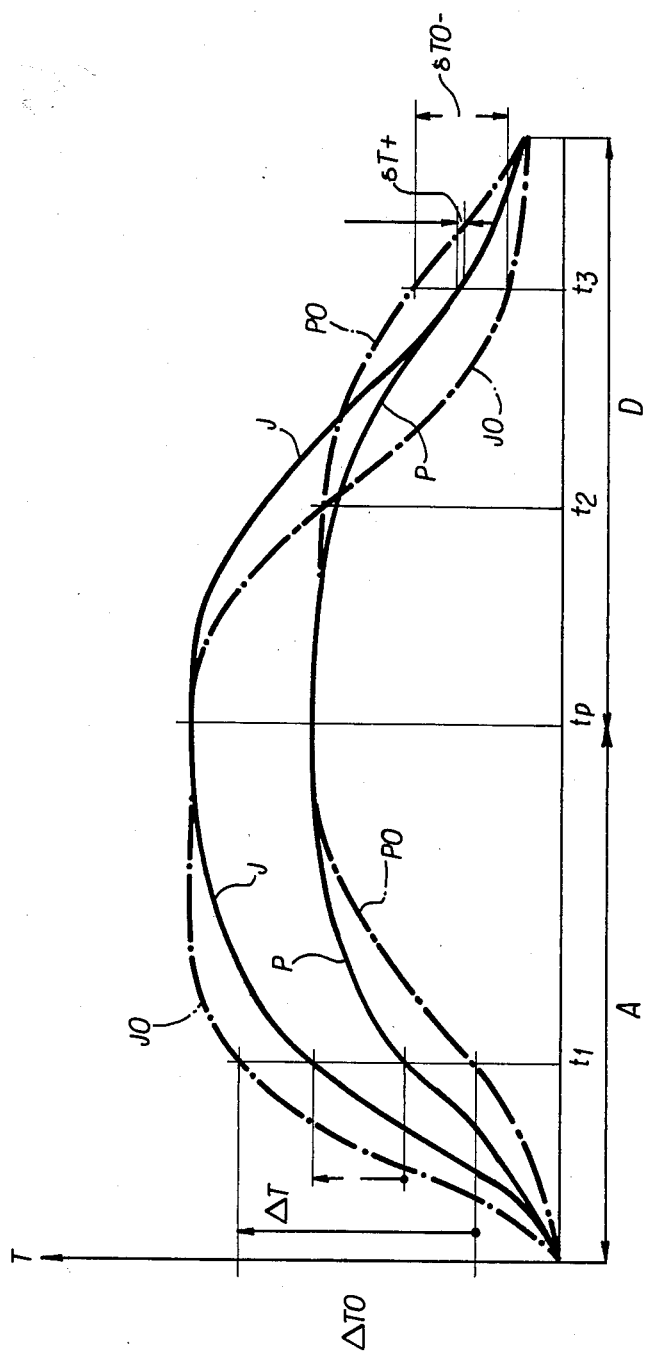
FIG. 2 is a graph illustrating the development of thermal stress in the disk of FIG. 1 during an acceleration phase and a deceleration phase of the turbine.

The Y-axis of the graph in FIG. 2 shows the temperature T of certain parts of disk 1 at given times t in the turbine's operating cycle. Time interval A corresponds to a phase of turbine acceleration and interval D to a phase of deceleration. Broken-line curves $J_o$ and $P_o$ respectively show the temperature variations of zones 1a and 1b of disk 1 and of its thick inner bored part 1c, in a situation in which the thermal control means of the invention are not used. The unbroken-line curves J and P are obtained when the previously described thermal control device is used, particularly at the beginning of each acceleration phase to cool parts 1a and 1b of disk 1 and to heat inner part 1c. It can be seen that at times $t_1$ in acceleration phase A, the temperature difference $\Delta T$ between the corresponding points on curves J and P is significantly lower than the corresponding temperature difference $\Delta T_o$ between curves $J_o$ and $P_o$ which would be obtained if the thermal control means of the invention had not been used. Its use thus ensures a great reduction in the expansion and thermal stress to which various parts of disk 1 are subjected, and thus increases disk life. Such use also makes it possible to preset the clearance between the tips of blades 2 carried on turbine disk 1 and the corresponding case in an acceleration phase, whereas without the control means of the present invention, this clearance could not be controlled in transient phases of the turbine's operation. This latter capability makes it possible to set said clearance as precisely as possible and, as a consequence, to have the turbine function constantly under optimal conditions from the point of view of performance.

If at time $t_p$ (FIG. 2) the turbine has reached a steady operating speed, and a deceleration phase D begins at that moment, the above-described thermal control means of the present invention are immediately switched by the aforesaid automatic device, so as to open valve 12b, while valve 12a remains closed. Hot air then moves into the annular chamber delimited on three sides by plate 10, then through openings such as 13 into distribution chamber 9, from which it next emerges through the perforations in plate 5A as jets which strike the corresponding areas of elements 2, 1a and 1b of disk 1 so as to heat them. Analogous means supply perforated plate 5B with hot air. Analogous means also bring a flow of cold air into the annular space between compressor drum 3 and the truncated extension of perforated plate 15C, which flow impinges the three surfaces of bulb 1c of disk 1, through the perforations in plates 15A, 15B, and 15C, as jets of cooling air. Of course, instead of sending hot air from an earlier stage of the turbine, for example, or from the nozzle at the stage under consideration, it would be possible to supply distribution chamber 9, simultaneously sending into said distribution chamber 9 cold air bled from the compressor through pipe 11a. To do this, the automatic device must simply cause valves 12a and 12b to open simultaneously and control their respective outputs so that the mixture of heating air in distribution chamber 9 will reach a preset temperature.

In the righthand portion of the graph of FIG. 2, the deceleration phase beginning at time $t_p$, when the turbine is at steady operating speed, is represented by curves $J_o$ and $P_o$, which may be reversed when there is no thermal control device in accordance with the teachings of the invention. These curves are such that curve $J_o$ drops below curve $P_o$ after time $t_2$. This results in an inversion of the direction of the thermal stresses to which the entire disk 1 is subjected. The graph of FIG. 2 shows that at time $t_3$ of deceleration phase D, subsequent to time $t_2$, the difference in temperature $\delta T_o$ between bulb 1c and rim 1a of disk 1 indeed has a sign contrary to its value $\Delta T$ at time $t_1$ of acceleration phase A. It can also be seen that the thermal control means of the present invention makes it possible to greatly reduce the amplitude of the negative thermal stresses $\delta T_o$ (curves $P_o$ and $J_o$) or, even better, to make them positive ($\delta T$ for curves J and P). Since alternating stress curves are especially harmful to turbine disks, it should be clear that the present invention can increase considerably the life of a disk.

The present invention is not limited to the previously described embodiments. It includes all their variants. In certain applications, it may suffice to thermally condition just one surface of the disk by means of perforated plates set up near their one surface. Whatever the differences between the thermal stresses present in the disk, around its two surfaces, it is always possible to control the local heating and cooling effects on these two surfaces of the disk or on one of these surfaces, so that the aforesaid differences between the superficial thermal stresses do not result in a bending or buckling of the disk, i.e., so as to ensure that its median plane always remains rigorously perpendicular to the turbine shaft.

Obviously, numerous modification and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Means for controlling heat expansion and thermal stress in a turbine rotor disk of a gas turbine machine including a turbine rotor disk having a radially inner bulb portion, a radially intermediate web portion and a radially outer rim portion, said means for controlling comprising:

perforated plates associated with at least one surface of each of at least two of said disk portions, each said perforated plate having a first side extending parallel to, and spaced from, the corresponding surface of said disk portion;

separate first conduit means associated with each of said at least two disk portions for communicating a second side of each said perforated plate with a source of cool air flow;

separate second conduit means associated with each of said at least two disk portions for communicating said second side of each said perforated plate with a source of hot air flow;

valve means in said first and second conduit means for regulating the flow of air therethrough; and control means connected to said valve means, whereby the radial temperature gradient of said disk is reduced during all operating phases of said gas turbine machine.

2. The means for controlling heat expansion and thermal stress of claim 1 wherein said perforated plates define a portion of a distribution chamber, each said distribution chamber being in fluid communication with said first and second conduit means.

3. The means for controlling heat expansion and thermal stress of claim 2 wherein one said perforated plate is associated with at least one surface of said rim and web portions of said disk, said one perforated plate and a second plate associated with said bulb portion are separated by at least one circumferentially extending partition, so as to define at least two radially spaced chambers, and wherein each of said radially spaced chambers is in fluid communication with a flow of air from said first and second conduit means which is of a different temperature than a flow associated with another of said radially spaced chambers.

4. The means for controlling expansion and thermal stress of claim 1 wherein said gas turbine machine includes a compressor drum and a central tube fixed for rotating together with said disk, wherein one said perforate plate is associated with at least one axial surface of said bulb portion of said disk, and wherein said compressor drum, said one perforate plate and a plate fixed to said central tube together define a portion of a distribution chamber in fluid communication with said first and second conduit means.

5. The means for controlling heat expansion and thermal stress of claim 4 wherein said gas turbine machine includes a compressor drum and a central tube fixed for rotation together with said disk, wherein a second said perforated plate is associated with at least one surface of said bulb portion of said disk, and wherein said compressor drum, said second perforate plate and said central tube together define a distribution chamber in fluid communication with said first and second conduit means.

6. The means for controlling expansion and thermal stress of claim 1 wherein said perforated plates are associated with both upstream and downstream surfaces of said disk.

7. The means for controlling expansion and thermal stress of claim 4 wherein said perforated plates are associated with both upstream and downstream surfaces of said disk.

8. The means for controlling expansion and thermal stress of claim 5 wherein said perforated plates are associated with both upstream and downstream surfaces of said disk.

* * * * *

UNITED STATES PATENT AND TRADEMARK OFFICE
CERTIFICATE OF CORRECTION

PATENT NO. : 4,741,153

DATED : May 3, 1988

INVENTOR(S) : Claude Hallinger, et al

It is certified that error appears in the above-identified patent and that said Letters Patent is hereby corrected as shown below:

Column 3, lines 10 and 11, delete in its entirety.

Signed and Sealed this

Sixth Day of December, 1988

*Attest:*

DONALD J. QUIGG

*Attesting Officer*  *Commissioner of Patents and Trademarks*